United States Patent [19]

Lawless

[11] 4,396,721
[45] Aug. 2, 1983

[54] GLASS CERAMIC MATERIALS HAVING CONTROLLABLE TEMPERATURE COEFFICIENTS OF DIELECTRIC CONSTANT

[76] Inventor: William N. Lawless, c/o Lake Shore Ceramics, Inc., 64 E. Walnut St., Westerville, Ohio 43081

[21] Appl. No.: 290,253

[22] Filed: Aug. 5, 1981

[51] Int. Cl.³ .............................................. C03C 3/22
[52] U.S. Cl. .............................. 501/10; 65/33; 361/321; 501/41; 501/69; 501/73; 501/134; 501/136
[58] Field of Search ............... 501/10, 134, 136; 65/33

[56] References Cited

U.S. PATENT DOCUMENTS

| | | | |
|---|---|---|---|
| 3,113,877 | 12/1963 | Janakirama-Rao | 501/10 |
| 3,195,030 | 7/1965 | Herczog et al. | 501/10 |
| 3,615,757 | 10/1971 | Herczog et al. | 501/10 |
| 3,649,891 | 3/1972 | Lawless | 501/10 |
| 3,785,833 | 1/1974 | Rapp | 501/10 |
| 3,787,219 | 1/1974 | Amin | 501/32 |
| 3,852,077 | 12/1974 | Rapp | 501/10 |
| 4,017,317 | 4/1977 | Rapp | 501/10 |

FOREIGN PATENT DOCUMENTS 1944017 3/1971 Fed. Rep. of Germany ....... 501/73

*Primary Examiner*—Helen M. McCarthy
*Attorney, Agent, or Firm*—Biebel, French & Nauman

[57] ABSTRACT

Glass ceramic materials having controllable temperature coefficients of dielectric constant or capacitance (TCC) are provided. The ceramic component of the composition possesses paraelectric properties at least over the temperature range of −55° C. to 125° C. and can be controllably crystallized from the glassy matrix initially formed. Heat treatment of the glass produces crystallization of the ceramic component and results in glass ceramic materials with controlled TCC values which are useful as capacitors, resonators, microwave substrates, and the like because of their low dielectric loss characteristics and temperature stability.

11 Claims, 17 Drawing Figures

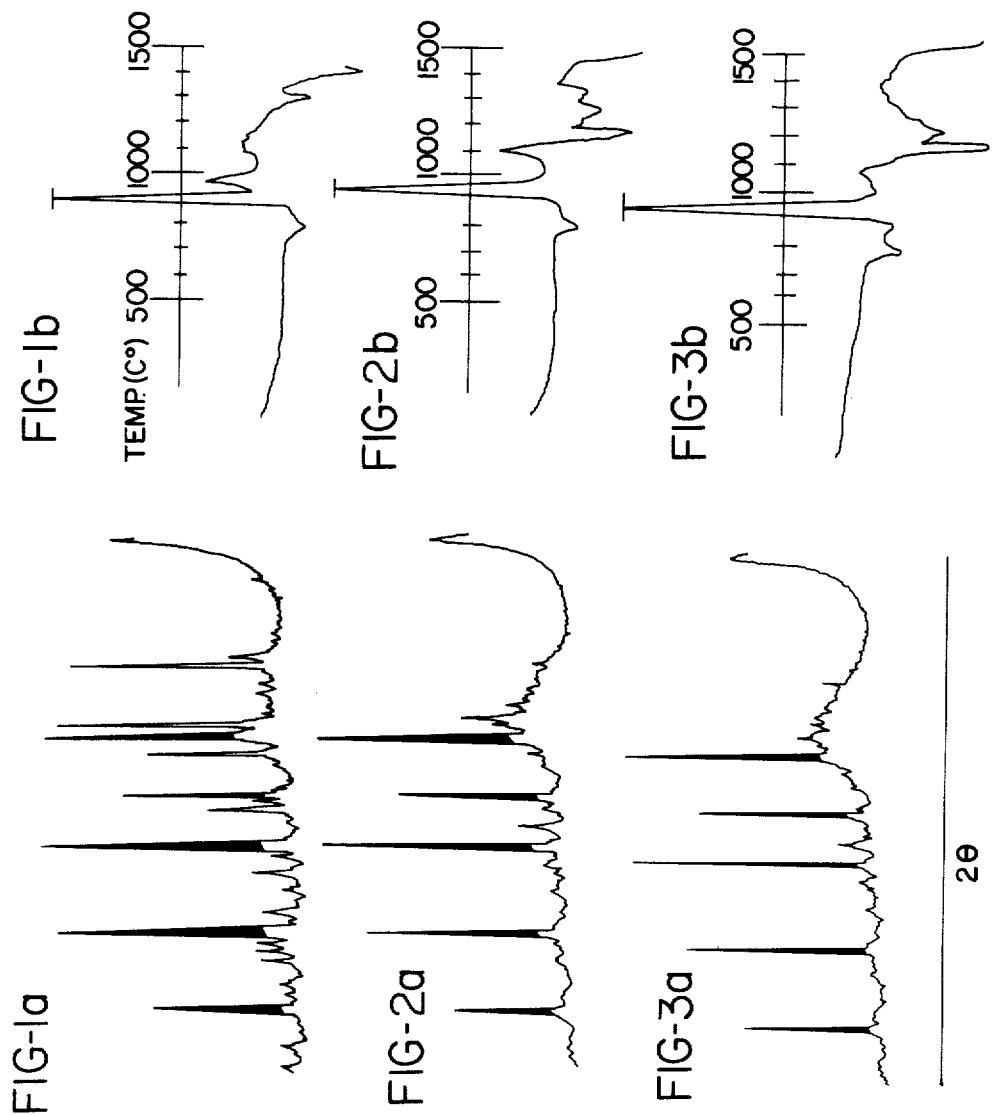

GLASS CERAMIC MATERIALS HAVING CONTROLLABLE TEMPERATURE COEFFICIENTS OF DIELECTRIC CONSTANT

BACKGROUND OF THE INVENTION

This invention relates to dielectric materials for use in electrical applications, and more particularly to glass ceramic materials having controllable temperature coefficients of dielectric constant or capacitance.

Many uses for dielectric materials require a temperature coefficient of capacitance (TCC) value which is near zero for the temperatures involved, typically $-55°$ to $125°$ C. for military specifications. That is, the rate of change in capacitance with respect to temperature must be near zero throughout the temperature range. Since capacitance is directly related to the dielectric constant of a material, the temperature coefficient of the dielectric constant must also be near zero. Such uses for these dielectric materials include capacitors (so-called NPO capacitors), resonators in microwave filter networks, and as microwave substrates below 5GHz. Military communications systems such as long range radar using microwaves and millimeter waves also require the use of low dielectric loss, temperature stable dielectric materials. Still other uses of such dielectric materials require specific TCC's (i.e., 100 ppm/°C.) for the temperatures involved.

Previously, dielectric materials meeting the above requirements were achieved by mixing appropriate quantities of ceramic materials which have both positive and negative TCC's. For example, mixtures of zirconates having a positive TCC and zirconates or titanates having a negative TCC have been used. See Kell, 38 J. Science and Technology No. 1 (1971). More recently, Kolar et al., 27 Ferroelectrics 269 (1980) have utilized ceramic compositions containing barium titanate ($BaTiO_3$) and neodymium oxide ($Nd_2O_3$).

However, such mixtures of ceramic materials have several major drawbacks to their use. Stability of the compositions is often compromised due to combinations of domain-wall effects and intergranular or interfacial phenomena. Domain, or so-called Bloch, walls consist of transition layers of a thickness of a few hundred lattice constants between adjacent ferromagnetic domains which adversely affect the properties of the compositions.

Moreover, ceramic materials require densification to avoid porosity and its associated moisture problems. Even the most sophisticated sintering or hot-pressing techniques may not be adequate to produce a theoretically 100% dense ceramic body. Finally, ceramics can be formed into the necessary geometric shapes only by expensive grinding, lapping, and polishing procedures. Molding techniques can be used only for the simplest of geometries.

Accordingly, the need exists for materials having the requisite TCC values which exhibit low dielectric losses at typical temperatures of operation, are pore free, and can be formed readily into complex geometrical shapes.

SUMMARY OF THE INVENTION

The present invention meets that need by providing a group of glass ceramic materials containing strontium titanate ($SrTiO_3$), potassium tantalate ($KTaO_3$), or other paraelectric material which can be controllably crystallized from a glass. By "glass-ceramic" it is meant that the material is originally formed as a glassy body in which, for example, $SrTiO_3$ or $KTaO_3$ crystallites have been controllably precipitated in a glass matrix. The glass ceramics of the present invention exhibit TCC's near zero, have low dielectric losses at very high frequencies (i.e., millimeter and microwave frequencies), are dense and pore-free, and can be readily formed into a variety of geometric shapes utilizing techniques which are well-known in the glass forming art.

The glass ceramics of the present invention can be crystallized in situ from several glassy matrices. Preferred glassy matrices include silicon and aluminum oxides as major constituents. Certain minor constituents such as, for example, $SrNb_2O_6$, $CuO$, and or $B_2O_3$ may also be present as is well known in the glass ceramic art. The glass is formed by melting a mixture of powdered compositions in a crucible at $1550-1700°$ C. followed by quenching the melt to room temperature. On reheating the quenched glass, the $SrTiO_3$, $KTaO_3$, or other paraelectric constituents of the glass spontaneously crystallize as the major phase.

Because the crystalline phases of the present invention such as the $SrTiO_3$ and $KTaO_3$ phases are paraelectric, they have negative temperature coefficients of capacitance (TCC) over at least the temperature range of $-55°$ to $125°$ C. Conversely, all glassy matrices have a positive TCC value in this temperature range. Thus, as the controlled crystallization of the paraelectric constituents of the glass proceeds, the overall TCC of the composition progresses from a positive to a negative value and, of course, at one point will equal zero. By controlling the extent of crystallization by controlling reheating of the glass, a TCC of any desired value can be produced.

Accordingly, it is an object of the present invention to provide glass ceramic compositions which have controllable temperature coefficients of capacitance, exhibit low dielectric losses at very high frequencies, are dense and pore free, and can be readily formed into a variety of shapes using standard glass forming techniques. This and other objects and advantages of the invention will become apparent from the following description, the accompanying drawings, and the appended claims.

BRIEF DESCRIPTION OF THE DRAWINGS

FIGS. 1a and 1b illustrate X-ray diffraction pattern and differential thermal analysis data, respectively, for a $SrTiO_3$ glass ceramic having a $SiO_2/Al_2O_3$ weight ratio in the glass phase of 2.0;

FIGS. 2a and 2b illustrate X-ray diffraction pattern and differential thermal analysis data, respectively, for a $SrTiO_3$ glass ceramic having a $SiO_2/Al_2O_3$ weight ratio in the glass phase of 3.5;

FIGS. 3a and 3b illustrate X-ray diffraction pattern and differential thermal analysis data, respectively, for a $SrTiO_3$ glass ceramic having a $SiO_2/Al_2O_3$ weight ratio in the glass phase of 5.0;

DESCRIPTION OF THE PREFERRED EMBODIMENTS

Figure 4A:
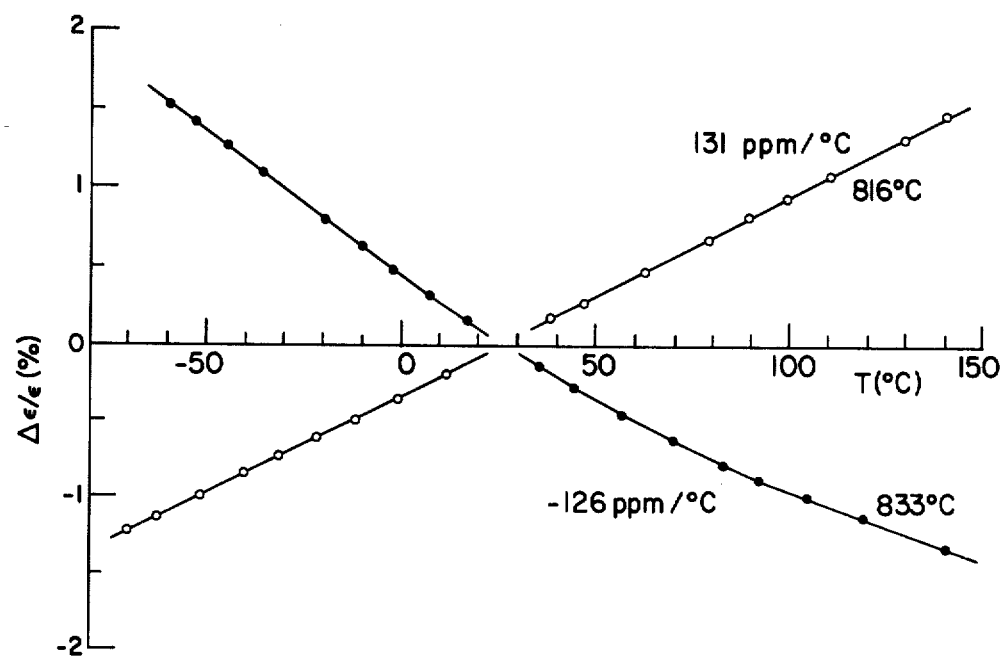
FIG. 4a is a graph of the percentage change in dielectric constant versus temperature for a $SrTiO_3$ glass ceramic heat treated at $816°$ C. and $833°$ C., respectively.

The glass ceramic compositions of the present invention are pore free and can readily be formed into complex geometrical shapes by standard glass-forming procedures which are well known in the art and will not be further discussed here. Additionally, these glass ceramic materials have controllable temperature coefficients of capacitance which can be modified by the controlled crystallization of the ceramic phase. Thus, the ceramic component of the present invention has two essential requisite properties.

First, it must exhibit paraelectric properties at least over the temperature range of interest, typically the military specification range of −55° C. to 125° C. Crystalline ceramic materials exhibiting paraelectric properties have negative dielectric constants which, when combined with the positive dielectric constants exhibited by all typical glassy materials, provide the means of controlling the overall temperature coefficient of capacitance of the glass ceramic.

Examples of such ceramics exhibiting paraelectric properties over the temperature range of interest include strontium titanate ($SrTiO_3$) and potassium tantalate ($KTaO_3$) which have a cubic perovskite crystal structure. Other ceramics having cubic perovskite structures such as barium titanate ($BaTiO_3$) are not suitable for use in the present invention since they exhibit ferroelectric properties and, thus, have positive dielectric constants over the temperature range of interest.

Second, the ceramic component of the present invention must be able to be controllably crystallized from the glass phase which is initially formed. This property is necessary so that the negative dielectric constant possessed by the crystalline ceramic component can be varied, thus controlling the overall temperature coefficient of capacitance of the composition.

For example, it has been found that a composition containing from 50-70% by weight $SrTiO_3$ and from 30-50% by weight of glassy constituents such as silicon dioxide ($SiO_2$) and aluminum oxide ($Al_2O_3$) produces a preferred glass ceramic composition. The weight ratio of the $SiO_2$ to $Al_2O_3$ may be varied from between about 2 to 10. Additionally, certain other minor constituents such as $SrNb_2O_6$, $CuO$, and $B_2O_3$ may also be present in the composition as is known in the glass ceramic art. Another preferred composition is one in which $KTaO_3$ is present at about 80% by weight to 20% by weight $Al_2O_3$.

A glass is initially formed by melting powders of the various constituents of the composition together in a crucible (platinum or similar high temperature metal) at from 1550°–1700° C. followed by quenching at room temperature. The glass melt can be homogenized by any of several methods known in the art such as stirring or cocktail mixing. Quenching may be accomplished, for example, by pouring the melt into a quenching mold or between water-cooled rollers.

Using several $SrTiO_3$ glass ceramic compositions as illustrative examples, on reheating the quenched glass, the ceramic $SrTiO_3$ spontaneously crystallizes as the major crystalline phase as shown by the X-ray patterns in FIGS. 1a, 2a, and 3a. The shaded peaks in these figures are the dominant $SrTiO_3$ diffraction pattern lines for compositions in which the $SiO_2$ to $Al_2O_3$ weight ratios are 2 (FIG. 1a), 3.5 (FIG. 2a), and 5(FIG. 3a), respectively. These data show that increasing the $SiO_2/Al_2O_3$ weight ratio from 2 to 5 suppresses the crystallization of minor phases.

It is believed that the crystallization of $SrTiO_3$ occurs by nucleation of the crystals on a phase-separated species in the original glass. The crystallization of $SrTiO_3$ occurs at about 900° C. as shown by the data in FIGS. 1b, 2b, and 3b taken by differential thermal analysis. The compositions shown in FIGS. 1b, 2b, and 3b correspond to those shown in FIGS. 1a, 2a, and 3a, respectively. The dominant crystallization exotherm in each instance is the $SrTiO_3$ crystallization.

Because the $SrTiO_3$ phase is paraelectric over at least the temperature range of −55° to 125° C., it has a negative temperature coefficient of dielectric constant or capacitance (TCC). Conversely, all typical glasses have positive TCC's in this temperature range. Consequently, as the crystallization of $SrTiO_3$ proceeds, the overall TCC of the composition progresses from a positive value to a negative value, and, at one point, will be equal to zero. This ability to control the TCC value of the composition is a key aspect of the invention.

Figure 4B:
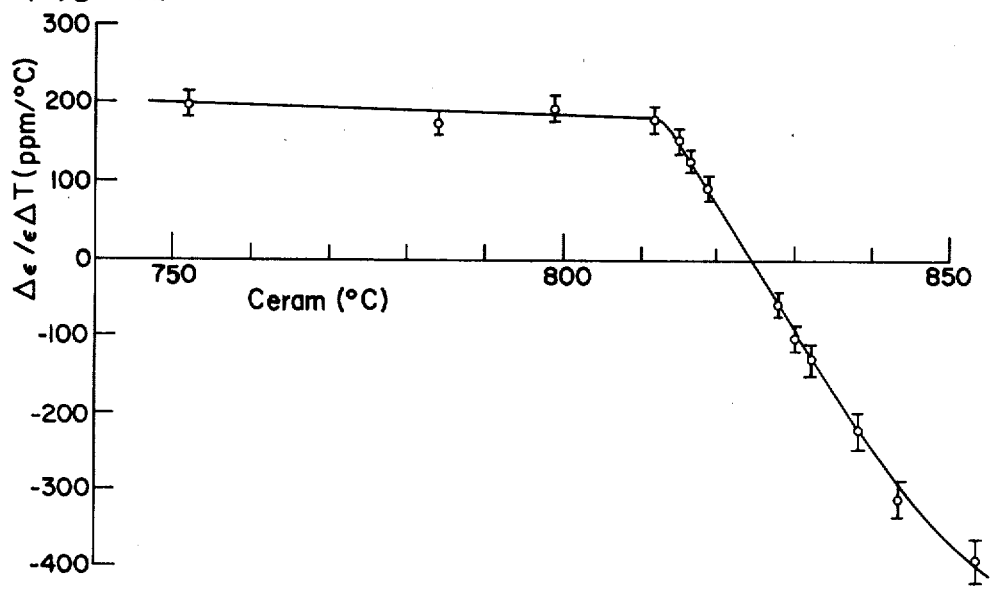
FIG. 4b is a graph of the temperature coefficient of capacitance (TCC) versus heat-treating temperature for a $SrTiO_3$ glass ceramic.

An example of this is illustrated in FIGS. 4a and 4b. FIG. 4a shows the change in dielectric constant (e) as a percentage versus temperature for $SrTiO_3$ glass ceramic materials heat treated at 816° C. and 833° C. for 2 hours each, respectively. The $SrTiO_3$ glass ceramic treated at 816° C. had an overall positive TCC value of 131 ppm/°C. while the $SrTiO_3$ glass ceramic treated at 833° C. had an overall negative TCC value of −126 ppm/°C. As can be seen, the change in dielectric constant over the temperature range of −55° to 125° C. is less than ±2%.

FIG. 4b shows a plot of TCC ($\Delta E/E\Delta T$) versus heating treating temperature of a $SrTiO_3$ glass ceramic composition. As can be seen, at an intermediate heat treating temperature of 824° C., the TCC of the composition passes through zero. FIG. 4b shows that prior to crystallization the base glass has a TCC of about 200 ppm/°C. As the heat-treating temperature is increased and crystallization proceeds, the TCC of the material passes through zero and increases negatively to values of −400 ppm/°C.

The data in FIGS. 4a and 4b are for heat treatment times of 2 hours. It has also been discovered that variations in the length of time heat treatment is carried out also effects the TCC of the composition. For example, holding the $SrTiO_3$ glass ceramic composition of FIGS. 4a and 4b at 820° C. for times in excess of 2 hours will cause the overall TCC value to approach zero.

The dielectric constant of the glass ceramics of the present invention near the TCC=0 value are typically in the range of from 20-30. The corresponding dielectric loss tangents (where the loss tangent is the ratio of the imaginary to real part of the dielectric constant) are in the range of 0.0002 to 0.0007 at kilohertz frequencies. The dielectric losses depend to a large extent on the glass homogeneity and the oxidation states of the positive ions of the ceramic component. These factors can be controlled by methods known in the glass ceramic art. For example, minor additions of CuO aid in the stabilization of the oxidation states of positive ions and, thus, stabilize the loss tangent values.

Because the ceramic crystals are grown in situ in the glassy matrix, the resulting glass ceramics are pore-free, fully densified bodies. This eliminates the moisture problems found when using conventional ceramics which always have some residual porosity. Moreover, the absence of domain walls in the paraelectric crystals and the stable, intimate boundaries between the crystals and glassy matrix impart a very high degree of electrical stability not found in conventional ceramics.

The formability of the glass ceramic compositions of the present invention also is an important improvement over conventional ceramics.

Figure 5:
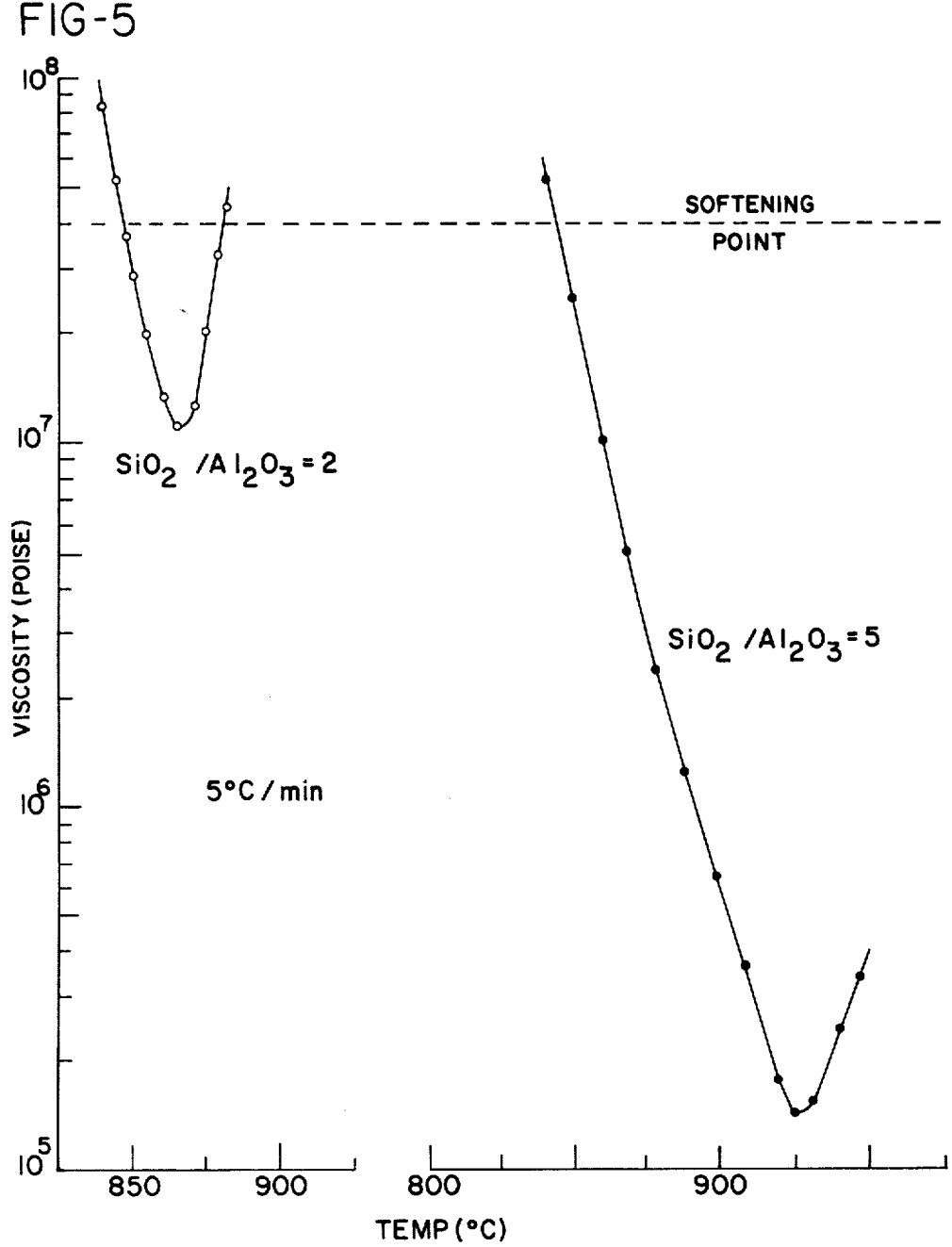
FIG. 5 is a graph of viscosity versus temperature for two $SrTiO_3$ glass ceramics.

FIG. 5 illustrates viscosity versus temperature data for two $SrTiO_3$ glass ceramics having $SiO_2/Al_2O_3$ weight ratios of 2 and 5, respectively. The minima in the viscosity curves correspond to the onset of $SrTiO_3$ crystallization. It can be seen that the $SiO_2/Al_2O_3=5$ glass softens considerably more than the $SiO_2/Al_2O_3=2$ glass prior to crystallization. The softening point, defined in the glass art as $4 \times 10^7$ poise, is also shown in dotted line form in FIG. 5, and illustrates that the glasses of the present invention lend themselves to standard glass forming and glass working techniques such as glass drawing. This ability to use these techniques provide considerable advantages over prior conventional ceramics in the formation of complex geometric shapes.

Figure 6A:
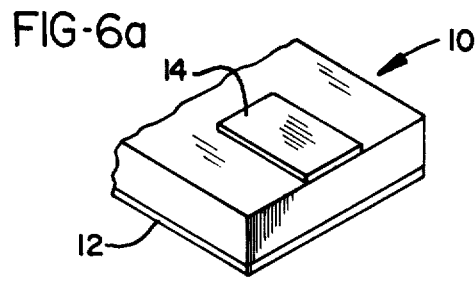
FIGS. 6a, b, c, and d illustrate the use of the glass ceramics of the present invention as substrates in microwave circuit elements.
Figure 6B:
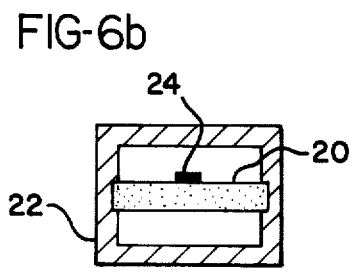
Figure 6C:
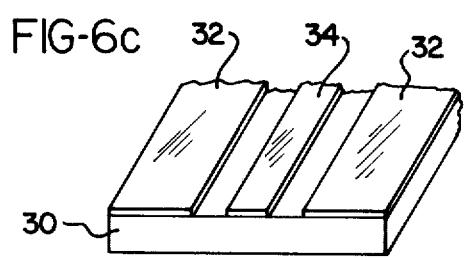
Figure 6D:
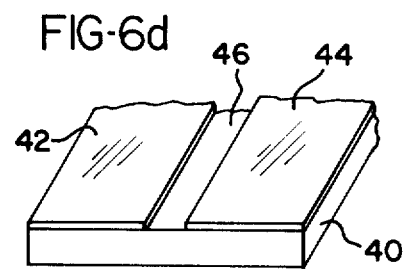

As illustrated in FIGS. 6a, b, c, and d, the glass ceramic composition of the present invention find use as dielectric substrate materials for microwave and millimeter wave circuit elements. FIG. 6a shows a microstrip having a dielectric substrate 10 formed from the glass ceramic compositions of the present invention, a conducting ground plane 12, and a metal conducting strip 14. FIG. 6b shows a suspended glass-ceramic dielectric substrate 20 surrounded by metal walls 22 and having an electrically conductive metal strip 24 thereon. FIG. 6c shows a coplanar waveguide having a glass-ceramic dielectric substrate support material 30, a ground plane 32 and a center conducting strip 34. FIG. 6d shows a slot line construction which utilizes a glass ceramic dielectric substrate support material 40, metal conductors 42 and 44, and a center slot 46.

Figure 7A:
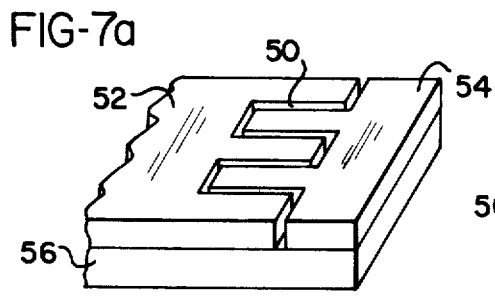
FIGS. 7a and b illustrate the use of the glass ceramics of the present invention as the dielectric material in two types of capacitors.
Figure 7B:
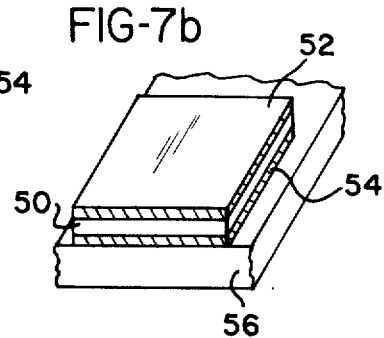

FIGS. 7a and b illustrate the use of the glass ceramic compositions of the present invention as the dielectric material in two typical capacitor constructions. FIG. 7a shows an interdigital capacitor having a glass ceramic dielectric 50 separating metal conductors 52 and 54 and supported on a substrate 56 which may or may not be the same glass ceramic composition. FIG. 7b shows a sandwich-type capacitor having a glass ceramic dielectric 50 separating metal layers 52 and 54 and supported on substrate 56.

Figure 8:
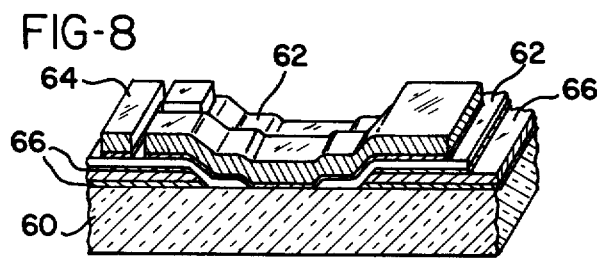
FIG. 8 illustrates the use of the glass ceramics of the present invention in a microwave integrated circuit.

FIG. 8 illustrates the use of the glass ceramic materials of the present invention in a more complex microwave integrated circuit. The glass ceramic is utilized both as a support substrate 60 and as a dielectric layer 62 separating metal layers 64 and 66 and forming capacitors A, B, C, and E and inductor D.

Figure 9:
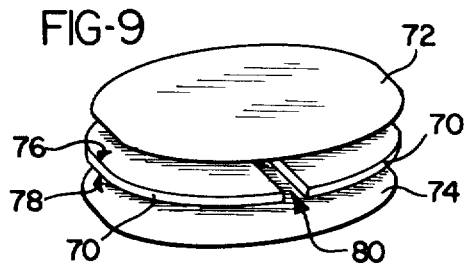
FIG. 9 illustrates the use of the glass ceramics of the present invention in a waveguide construction as a half-wavelength resonator.

FIG. 9 illustrates the use of the glass ceramic compositions of the present invention in a strip-line waveguide construction in which they serve as half-wavelength resonators. As shown, glass ceramic dielectric support material 70 is sandwiched by metal ground planes 72 and 74 and has metal shims 76 and 78 on the upper and lower surfaces thereof, respectively. An equivalent circuit of parallel and series capacitances exists at the gap 80 as will be recognized by those skilled in this art. The constructions shown in FIGS. 6-9 are intended to be exemplary only, and other electrical devices which could utilize the glass ceramic compositions of the present invention will be apparent to those skilled in this art.

While the compositions and methods herein described constitute preferred embodiments of the invention, it is to be understood that the invention is not limited to these precise compositions and methods, and that changes may be made in either without departing from the scope of the invention which is defined in the appended claims.

What is claimed is:

1. A glass-ceramic composition having a controllable temperature coefficient of capacitance and which exhibits low dielectric losses at very high frequencies, wherein the crystal content thereof is 50% or more by weight of a compound having paraelectric properties at least over the temperature range of $-55°$ to $125°$ C., selected from the group consisting of $SrTiO_3$ and $KTaO_3$ and wherein the change in dielectric constant of said glass-ceramic material over the temperature range of $-55°$ to $125°$ is less than $\pm 2\%$.

2. The glass-ceramic composition of claim 1 in which said compound is $SrTiO_3$ which is present in the crystalline phase of the composition and constitutes 50-70% by weight of the composition.

3. The glass-ceramic composition of claim 2 in which the glass phase of the composition comprises $SiO_2$ and $Al_2O_3$.

4. The glass-ceramic composition of claim 3 in which the ratio of $SiO_2$ to $Al_2O_3$ in said glass phase varies from 2 to 10.

5. The glass-ceramic composition of claim 1 in which said compound is $KTaO_3$ which is present in the crystalline phase of the composition and constitutes about 80% by weight of the composition and aluminum oxide is present in the glassy phase of the composition and constitutes about 20% by weight of the composition.

6. A process of forming a glass-ceramic composition having a predetermined value of temperature coefficient of capacitance in the range of from 200 ppm/°C. to $-400$ ppm/°C. over the temperature range of $-55$ to $125°$ C. comprising the steps of, mixing together 50% or more by weight of (1) a ceramic compound having paraelectric properties at least over the temperature range of $-55°$ to $125°$ C., selected from the group consisting of $SrTiO_3$ and $KTaO_3$ and which can be controllably crystallized from a glassy matrix and (2) one or more glass-forming compounds, heating the mixture until a glass is formed, quenching the glass melt to solidify it, then reheating the glass to a temperature at which crystallization of the ceramic compound in the glass occurs, and maintaining said temperature for a time sufficient for said predetermined value of temperature coefficient of capacitance to be attained.

7. The process of claim 6 in which said ceramic compound is $SrTiO_3$.

8. The process of claim 6 in which said ceramic compound is $KTaO_3$ and the glass forming compound is aluminum oxide.

9. In an electrical device which includes a dielectric material, the improvement comprising, as the dielectric material a glass-ceramic compositions having a temperature coefficient of capacitance in the range of from 200 ppm/°C. to −400 ppm/°C. over the temperature range of −55 to 125° C. and which exhibits low dielectric losses at very high frequencies, wherein the crystal content thereof is 50% or more by weight of a compound having paraelectric properties at least over the temperature range of −55° to 125° C. and selected from the group consisting of $SrTiO_3$ and $KTaO_3$.

10. The electrical device of claim 9 in which said glass-ceramic composition includes $SrTiO_3$.

11. The electrical device of claim 9 in which said glass-ceramic composition includes $KTaO_3$ in the crystalline phase and aluminum oxide in the glassy phase of the composition.

* * * * *